(12) United States Patent
Kashikhin

(10) Patent No.: US 12,051,539 B2
(45) Date of Patent: Jul. 30, 2024

(54) CONDUCTOR ON MOLDED BARREL MAGNET ASSEMBLY AND ASSOCIATED SYSTEMS AND METHODS

(71) Applicant: Fermi Research Alliance, LLC, Batavia, IL (US)

(72) Inventor: Vadim V. Kashikhin, North Aurora, IL (US)

(73) Assignee: Fermi Research Alliance, LLC, Batavia, IL (US)

(*) Notice: Subject to any disclaimer, the term of this patent is extended or adjusted under 35 U.S.C. 154(b) by 0 days.

(21) Appl. No.: 18/136,590

(22) Filed: Apr. 19, 2023

(65) Prior Publication Data

US 2023/0253136 A1 Aug. 10, 2023

Related U.S. Application Data

(63) Continuation of application No. 16/841,475, filed on Apr. 6, 2020, now Pat. No. 11,664,143.

(51) Int. Cl.
*H01F 6/06* (2006.01)
*B22F 10/00* (2021.01)
(Continued)

(52) U.S. Cl.
CPC ............... *H01F 6/06* (2013.01); *B22F 10/00* (2021.01); *B23K 26/342* (2015.10);
(Continued)

(58) Field of Classification Search
None
See application file for complete search history.

(56) References Cited

U.S. PATENT DOCUMENTS

| 9,734,272 B2 | 8/2017 | Clark et al. |
| 2009/0122812 A1 | 5/2009 | Steiner et al. |

(Continued)

OTHER PUBLICATIONS

Christiansen, J., et al., "RD Collaboration Proposal: Development of Pixel Readout Integrated Circuits for Extreme Rate and Radiation", RD53 Scientific Committee Paper, Jun. 5, 2013.
(Continued)

*Primary Examiner* — Bernard Rojas
(74) *Attorney, Agent, or Firm* — William A. Harding; Grable Martin PLLC

(57) ABSTRACT

A Conductor on Molded Barrel (COMB) magnet assembly optimized for High Temperature Superconducting (HTS) materials. The magnet assembly comprises a magnetic coil (s) carried by a conductor support structure and configured in cosine-theta geometry. Created using additive manufacturing, the conductor support structure features a continuous cable channel that fittedly carries and positions elongated straight portion(s) of the magnetic coil(s) parallel to a magnetic axis. The conductor support structure may be cylindrically shaped and longitudinally bored, with the continuous cable channel comprising an outer channel portion (distal on the cylinder) and an inner channel portion (proximal on the cylinder). A transition hole that joins the outer channel portion and the inner channel portion allows a single magnetic coil to be wound along both the outer and inner surfaces of the conductor support structure. The conductor support structure may be fabricated as longitudinally-symmetrical halves, and secured for operation using azimuthal and/or midplane shims.

10 Claims, 12 Drawing Sheets

(51) Int. Cl.
  *B23K 26/342* (2014.01)
  *B23K 26/354* (2014.01)
  *B33Y 10/00* (2015.01)
  *B33Y 70/00* (2020.01)
  *H01F 1/147* (2006.01)
  *H01F 5/02* (2006.01)
  *H01F 41/04* (2006.01)
  *H01F 41/082* (2016.01)
  *B33Y 80/00* (2015.01)

(52) U.S. Cl.
  CPC ............ *B23K 26/354* (2015.10); *B33Y 10/00* (2014.12); *B33Y 70/00* (2014.12); *H01F 1/147* (2013.01); *H01F 5/02* (2013.01); *H01F 41/048* (2013.01); *H01F 41/082* (2016.01); *B33Y 80/00* (2014.12)

(56) References Cited

U.S. PATENT DOCUMENTS

| | | |
|---|---|---|
| 2011/0022908 A1 | 1/2011 | Wang et al. |
| 2011/0022909 A1 | 1/2011 | Wang et al. |
| 2013/0305199 A1 | 11/2013 | He et al. |
| 2018/0121587 A1 | 5/2018 | Monga et al. |
| 2020/0211418 A1* | 7/2020 | Greiner ................ G09B 21/003 |
| 2021/0295739 A1* | 9/2021 | Moon .................. G09B 21/004 |

OTHER PUBLICATIONS

Garcia-Sciveres, Mauricio, "RD53A Integrated Circuit Specifications", RD53 Collaboration, Version 3.2, Dec. 13, 2015.

Miryala, Sandeep, "SEE Tolerant Standard Cell Based Design While Guaranteeing Specific Distance Between Memory Elements", Topical Workshops on Electronics for Particle Physics (TWEPP2017), Santa Cruz, California, Sep. 11-14, 2017.

Miryala, Sandeep, et al., "Characterization of Soft Error Rate Against Memory Elements Spacing and Clock Skew in a Logic with Triple Modular Redundancy in a 65nm Process", Topical Workshop on Electronics for Particle Physics (TWEPP2018), Antwerp, Belgium, Sep. 17-21, 2018.

Narasimham, B., et al., "On-Chip Characterization of Single Event Transient Pulse Widths", IEEE Trans. Dev. Mat. Ref., vol. 6, No. 4, Dec. 2006, pp. 542-549.

* cited by examiner

PRIOR ART

PRIOR ART

900

| Test mode | Param. at SSL | Insert coil ID, mm | |
|---|---|---|---|
| | | 40 | 100 |
| HTS+LTS powered in series | $B_1$, T | 10.39/11.52 | 7.69/8.43 |
| | $B_p$, T | 10.91/12.11 | 8.63/9.48 |
| | I, kA | 5.96/6.72 | 7.09/7.95 |
| HTS+LTS powered separately | $B_1$, T | 16.15/17.77 | 11.82/12.93 |
| | $B_p$, T | 16.56/18.25 | 13.46/14.73 |
| | $I_{HTS}$, kA | 4.37/5.07 | 5.10/5.87 |
| | $I_{LTS}$, kA | 10.99/12.17 | 14.38/15.86 |

| Test mode | Param. at SSL | Value |
|---|---|---|
| With iron yoke (OD = 400 mm) | $B_1$, T | 0.80 / 4.06 / 4.40 |
| | $B_p$, T | 1.06 / 5.27 / 5.73 |
| | I, kA | 1.92 / 10.19 / 11.22 |
| No iron yoke | $B_1$, T | 0.55 / 2.74 / 2.98 |
| | $B_p$, T | 0.85 / 4.22 / 4.60 |
| | I, kA | 2.42 / 11.96 / 13.02 |

FIG. 9B

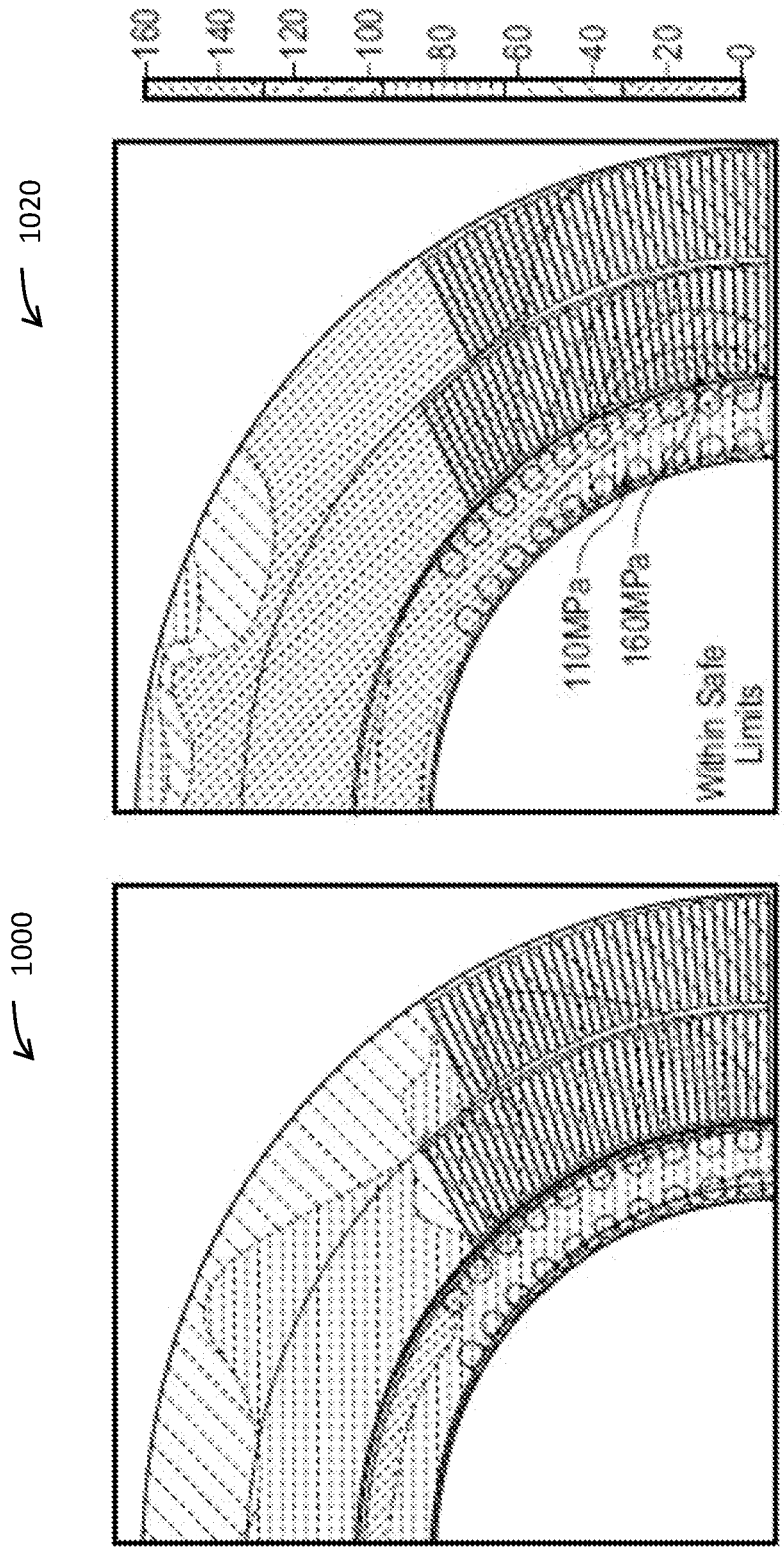

CONDUCTOR ON MOLDED BARREL MAGNET ASSEMBLY AND ASSOCIATED SYSTEMS AND METHODS

CROSS-REFERENCE TO RELATED APPLICATIONS

This application is a continuation and claims the benefit under 35 U.S.C. § 120 of U.S. patent application Ser. No. 16/841,475 filed by the inventor of the present application on Apr. 6, 2020 and titled CONDUCTOR ON MOLDED BARREL MAGNET ASSEMBLY AND ASSOCIATED SYSTEMS AND METHODS, the entire contents of which are incorporated herein by reference.

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to superconducting magnet technology. More particularly, this invention pertains to devices, systems, and associated methods for achieving performance gains in particle accelerator magnets using high temperature superconductor (HTS) materials.

BACKGROUND OF THE INVENTION

As a matter of definition, a "circular particle accelerator" (also referred to as a "circular collider") is a machine configured to repeatedly propel a beam of charged particles (e.g., protons, electrons) through a circular vacuum chamber, and to accelerate that beam of particles to a desired energy level before placing a target into the beam's path and observing the resultant collision. Commonly in particle accelerator design, high magnetic fields may be applied to bend particle beams and/or to focus the beams before a planned collision.

Increasing the magnetic field strength in the main bending and focusing magnets of circular particle accelerators is an area of continued research interest for enhancing the performance of the world's preeminent particle accelerators, both past and present, including the Tevatron, the Hadron-Electron Ring Accelerator (HERA), the Super Proton Synchrotron (SPS), the Relativistic Heavy Ion Collider (RHIC), and the Large Hadron Collider (LHC). While the evolution of designs for those colliders include exploitation of larger vacuum chamber circumferences to enhance performance, increasing the magnetic field strength remains a crucial means for achieving the higher beam energies required in the next generation particle accelerators (for example, the planned upgrade of the LHC to a 27 tera electron Volts (TeV) High-Energy LHC (HE-LHC) and also the 100 TeV Future Circular Collider study's energy-frontier hadron collider (FCC-hh) both anticipate a need to achieve a nominal dipole field strength of 16 Teslas (T), which requires a peak coil field of approximately 18 T to provide sufficient operating margins).

A "superconducting magnet," as used herein, refers to an electromagnet featuring a superconducting coil made of a material that, usually at low temperatures, conducts electrical current without loss of energy due to electrical resistance and, therefore, produces a high magnetic field. Superconducting magnets of known hadron colliders, including Tevatron, HERA, RHIC, and LHC, have typically employed cosine-theta coils comprising flat cables with large aspect ratios. As used herein, cosine-theta geometry may refer to conductors spatially distributed around a substantially cylindrical support in such a way that the superposition of magnetic fields from currents flowing in all conductors generates a substantially uniform field in the magnet bore or a predetermined order (e.g., dipole, quadrupole, sextupole, octupole, decapole, etc.). Such coil geometry tends to work well with Low Temperature Superconducting (LTS) materials such as niobium-titanium (NbTi) and niobium-tin ($Nb_3Sn$), both of which are sufficiently ductile to be produced as round strands. As shown in the prior art illustration of FIG. 1, such strands are commonly transposed into a Rutherford type cable structure 100 and wound as self-supporting coils 110 of the Roman arch geometry.

Using the LTS superconducting magnet technology described above, LHC magnets operate at a nominal dipole field strength of 8.36 T which approaches the 10 T mark that is considered to be the upper limit of niobium-titanium accelerator magnets (e.g., due to field and/or radiation/temperature constraints). Therefore, a need exists for improved magnet technology designs that boost magnet performance through employment of coils comprising High Temperature Superconducting (HTS) materials.

Presently, RE-Ba2Cu3O7-δ coated conductors (also referred to as Rare Earth, Barium-Copper-Oxide or REBCO) and Bi2Sr2CaCu2Ox (also referred to as Bi-2212), are among the most promising HTS materials available in long lengths that have demonstrated engineering current densities ($J_e$) of interest to high field magnets beyond those of niobium-tin ($Nb_3Sn$). As shown in the prior art illustration of FIG. 2, REBCO 210 is a highly anisotropic superconductor that is typically made available in tape form 200 and that does not require any heat treatment by the end user. In addition, a careful material selection for the deposition substrate 220 (e.g., Stainless Steel, Hastelloy) may result in REBCO tapes exhibiting remarkable mechanical properties. However, due to the conductor geometry, cabling techniques developed for LTS materials may not be directly applied to REBCO conductors. Unlike LTS strands, which may experience considerable transverse deformation and longitudinal extrusion with little or no impact on the resultant cable performance, REBCO tape is not readily deformable nor extrudable without risk of damage to the tape's superconducting layer. This structural limitation of REBCO tape complicates employment of this structure in the form of coils to achieve improved performance in accelerator magnets.

Several approaches to fabricating REBCO-based cables are being investigated in the art, including Twisted Stack Tapes (TST), Roebel and Conductor on Round Core (CORC®). In particular, the CORC® cable design comprises many REBCO tapes wound in multiple layers around a cylindrical wire (also referred to herein as a "cable") and has been produced with up to 50 HTS tapes per cable and with engineering critical current densities exceeding that of $Nb_3Sn$ at the fields above 16 T. Of benefit to CORC® cables are the efforts toward reduction of the substrate thickness, with a demonstrated value of 30 micrometers (μm). Thinner substrates may allow smaller copper (Cu) formers in CORC® cables, resulting in higher $J_e$, additional cable flexibility, and current density retention at smaller bending radii.

Bi-2212, on the other hand, is produced as a multifilamentary round wire, which is a big advantage over REBCO, as it allows for the manufacturing of widely used Rutherford type cables. However, reaching the state of the art $J_e$ requires an overpressure, high temperature reaction in the oxygen environment with a temperature window of a few degrees, which creates additional constraints in the magnet fabrication process. While the magnetization may be controllable due to the multifilamentary nature of the conductor, from a mechanical viewpoint, given the Bi-2212 material's brittle ceramic composition in a soft Ag alloy matrix, Bi-2212 is considerably less forgiving than REBCO.

Complicating the field even further, use of the HTS conductors, especially in the round form, requires an additional support structure to hold the coil turns in the correct position as well as to reduce the stresses on the conductors for strain-sensitive materials such as Bi-2212. Known Canted-Cosine-Theta (CCT) magnet technology offers such coil support, which is well suited for round conductors.

Accordingly, a need exists for a solution to at least one of the aforementioned challenges in applying superconducting magnet technology to particle accelerators. For instance, an established need exists for improvements in the state of the art for fabricating and deploying magnetic coils comprising HTS materials to enable electromagnet performance gains.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to Conductor on Molded Barrel (COMB) magnet technology optimized for High Temperature Superconducting (HTS) materials. In certain embodiments, the HTS coil design and support structure of the present invention may be implemented as inserts in host magnets to advantageously boost the magnetic field in particle accelerator magnets known in the art (e.g., $Nb_3Sn$).

In a first embodiment of the present invention, a COMB magnet assembly may comprise one or more magnetic coils carried by a conductor support structure and configured in a cosine-theta geometry. Each coil may be made of a conductive cable formed into some number of elongated straight portions. The conductor support structure may feature a continuous cable channel configured to fittedly carry the magnetic coil(s) and to position the elongated straight portion(s) parallel to a magnetic axis of the COMB magnet assembly.

In a second aspect, the magnetic coil(s) of the magnet assembly may be made of a conductive material that is one of High Temperature Superconducting (HTS), Low Temperature Superconducting (LTS), and purely resistant cable. For example, and without limitation, an HTS coil may be made of Rare Earth, Barium-Copper-Oxide (REBCO) and/or Bi2Sr2CaCu2Ox (Bismuth 2212). Workable geometric shapes for the coil(s) may include round, square, and rectangular. Although exemplary dipole coil(s) are described in detail herein, aspects of the COMB magnet assembly may be of any useful poles type including, but not limited to, normal or skew dipole, quadrupole, sextupole, octupole and decapole.

In another aspect, the conductor support structure of the COMB magnet assembly may be formed from a metal or a metallic alloy material such as Stainless Steel, Titanium, Copper, Bronze, Brass, and Aluminum; and/or from a non-metallic material such as plastic and fiber-reinforced composite. In the exemplary embodiment described herein, the conductor support structure may be substantially cylindrically shaped, defining a distally-positioned outer surface; and may be longitudinally bored, defining a proximally-positioned inner surface. The continuous cable channel of the conductor support structure may feature an outer channel portion incised in its outer surface, and an inner channel portion incised in its inner surface. A transition hole may join the outer channel portion and the inner channel portion.

In another aspect, the conductor support structure may be formed by two longitudinally symmetrical halves. An azimuthal shim may be positioned in mechanical communication with the outer surface of either or both halves of the conductor support structure. A midplane shim may be positioned in mechanical communication with both halves along a plane of symmetry between the halves.

In another embodiment of the present invention, a method of manufacturing a COMB magnet assembly may include steps of a) molding a conductor support structure having a continuous cable channel characterized by some number of elongated straight portions positioned parallel to a desired magnetic axis, and b) fittedly winding one or more magnetic coils (i.e., conductive cable) into the continuous cable channel of the conductor support structure to define a cosine-theta geometry.

In another aspect, the manufacturing method may further comprise fabricating the magnetic coil(s) from a High Temperature Superconducting (HTS) material type such as REBCO or Bismuth 2212 and having a cable geometry that is round, square, or rectangular.

In another aspect of the manufacturing method, molding the conductor support structure may further comprise fabricating the conductor support structure from one or more of Stainless Steel, Titanium, Copper, Bronze, Brass, Aluminum, plastic, and fiber-reinforced composite; and such that the structure takes on a substantially cylindrical shape defining a distally-positioned outer surface, and a longitudinal bore defining a proximally-positioned inner surface. Such molding may be by means of additive manufacturing, such as direct metal laser sintering (DMLS), electron beam melting (EBM), or selective laser melting (SLM) for metals; and fused deposition modeling (FDM) for plastics.

In another aspect of the manufacturing method, molding the conductor support structure may further comprise fabricating the conductor support structure to include an outer channel portion incised in the outer surface; an inner channel portion incised in the inner surface; and a transition hole configured to join the outer channel portion and the inner channel portion.

In another aspect of the manufacturing method, fittedly winding the magnetic coil(s) may further comprise a) pulling a first portion of the magnetic coil(s) through the transition hole to position the first portion proximate the inner surface and to position a second portion of the magnetic coil(s) proximate the outer surface; b) fittedly winding the first coil portion into the inner channel portion of the conductor support structure; and c) fittedly winding the second coil portion into the outer channel portion of the conductor support structure.

In another aspect of the manufacturing method, molding the conductor support structure may further comprise fabricating the conductor support structure to include two longitudinally-symmetrical halves. The manufacturing method may then further comprise positioning an azimuthal shim in mechanical communication with the outer surface of at least one of the halves of the conductor support structure, and a midplane shim in mechanical communication with both halves along a plane of symmetry between the two halves.

In another embodiment of the present invention, a method of operating an insert COMB magnet assembly (as described above) to augment a host dipole magnet may include the step of inserting the insert COMB magnet assembly into a host bore of the host dipole magnet. The insert COMB magnet assembly and the host bore may be of substantially equal diameters. The operating method may further comprise the step of positioning an azimuthal shim in mechanical communication with an outer surface of the insert COMB magnet assembly and an inner surface of the host bore of the host dipole magnet.

In another aspect, the method of operating an insert COMB magnet assembly (as described above) may include receiving an auxiliary magnet assembly into the longitudinal bore of the insert COMB magnet assembly. The auxiliary magnet assembly and the longitudinal bore may be of substantially equal diameters.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 9A is a table illustrating summary performance results using the simulated first and second exemplary configurations of FIGS. 7A and 7B;

FIG. 9B is a table illustrating summary performance results using the simulated third and fourth exemplary configurations of FIGS. 8A and 8B;

FIG. 10A is a schematic diagram illustrating von Mises stresses as simulated for a cool down condition illustrated in the table of FIG. 9A; and FIG. 10B is a schematic diagram illustrating von Mises stresses as simulated for a maximum condition illustrated in the table of FIG. 9A.

Like reference numerals refer to like parts throughout the several views of the drawings.

DETAILED DESCRIPTION OF THE INVENTION

Figure 1:
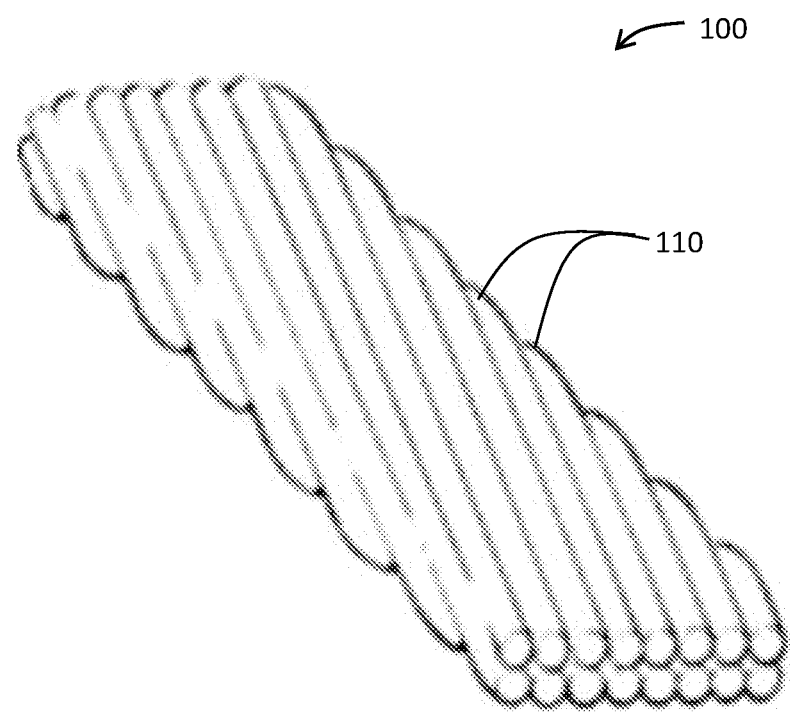
FIG. 1 is an assembled, perspective top view of an exemplary Rutherford type cable structure according to the prior art.
Figure 2:
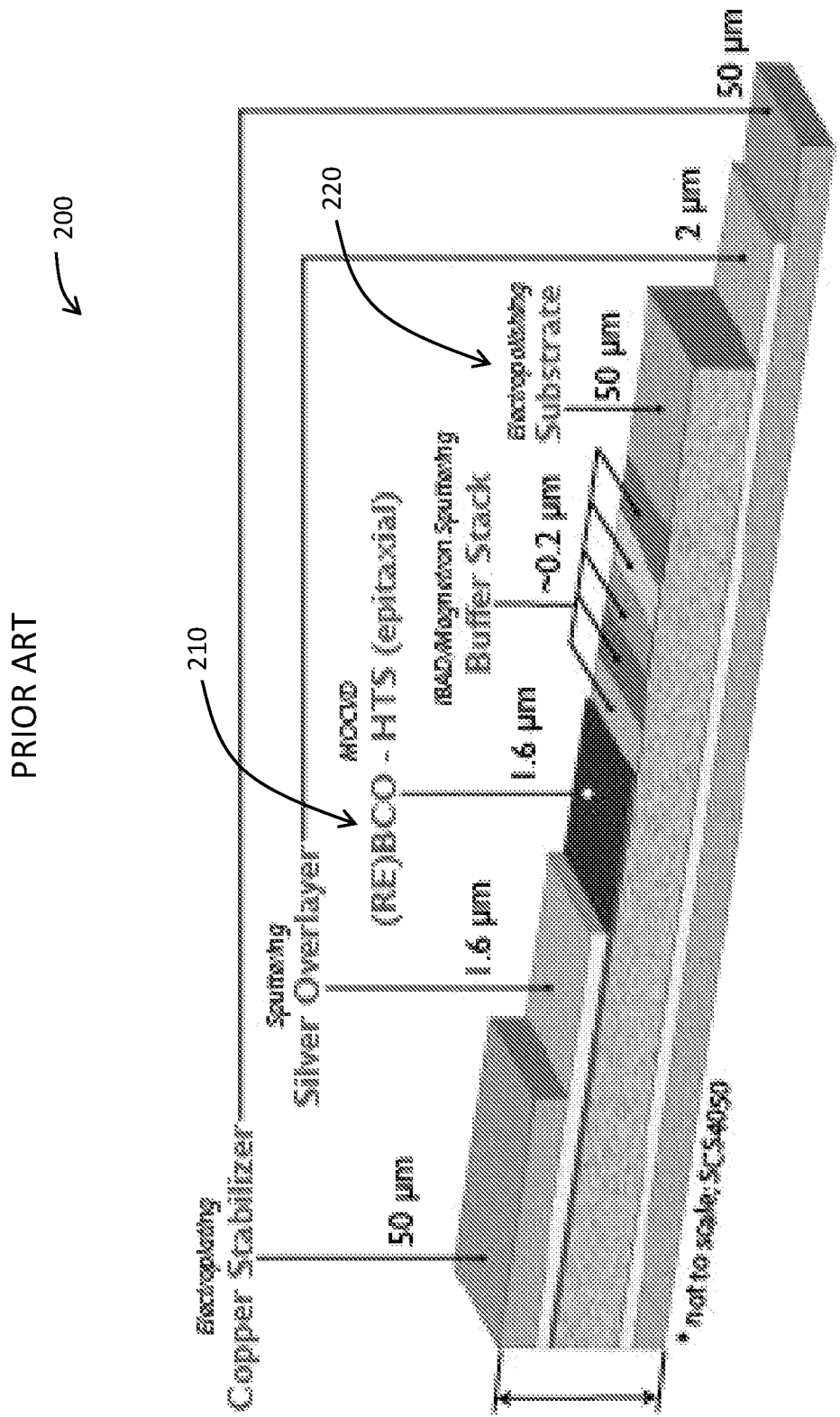
FIG. 2 is a cutaway, perspective top view of an exemplary High Temperature Superconducting (HTS) tape according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring initially to FIGS. 3-6, a Conductor on Molded Barrel (COMB) magnet assembly according to an embodiment of the present invention is now described in detail. Throughout this disclosure, the present invention may be referred to as a COMB assembly, a COMB magnet, a COMB device, an electromagnet assembly, a magnet assembly, a magnet, an assembly, a device, a system, a product, and/or a method for augmenting a particle accelerator design. Those skilled in the art will appreciate that this terminology is only illustrative and does not affect the scope of the invention. For instance, the present invention may just as easily relate to stand-alone electromagnet technology.

Generally speaking, Conductor on Molded Barrel (COMB) magnet technology introduces individual conductor support to the traditional cosine-theta magnet technology used in superconducting magnets of every particle accelerator starting from Tevatron. This technology, as described hereinbelow, may allow magnet designers to work with unconventional (e.g. round) conductor geometries, as well as produce magnet designs that may reduce the mechanical stresses on the conductors, may improve the conductor positional tolerances and consequently the magnetic field quality, and may minimize the labor needed during coil fabrication. Although originally conceived for dipole coils made of High Temperature Superconducting (HTS) materials, COMB magnet technology may be adaptable to normal or skew magnets with any number of poles (e.g. quadrupoles, sextupoles, octupoles, decapoles, etc.) made of HTS, Low Temperature Superconducting (LTS) or purely resistive cables.

Figure 3:
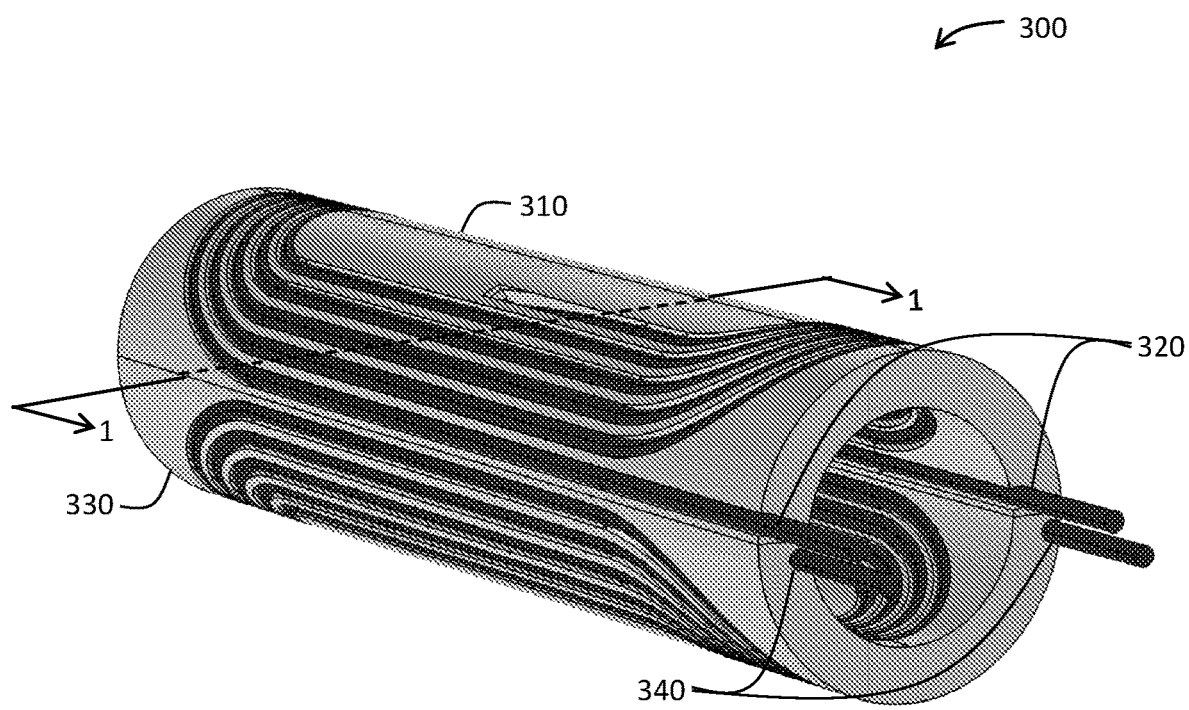
FIG. 3 is an assembled, perspective top view of a Conductor on Molded Barrel (COMB) magnet assembly according to an embodiment of the present invention.

Referring now to FIG. 3, in more detail, a Conductor on Molded Barrel (COMB) magnet assembly 300, according to an embodiment of the present invention, may include one or more magnetic coils (as illustrated, a top coil 320 and a bottom coil 340) each configured in a cosine-theta geometry and carried by a conductor support structure (as illustrated, comprising a top half structure 310 to carry the top coil 320, and a bottom half structure 330 to carry the bottom coil 340). The magnetic coil(s) 320, 340 of the magnet assembly 300 may be constructed of a conductive material of a High Temperature Superconducting (HTS) type to exploit the performance gains possible with HTS materials (although the present design may still be operable and provide advantages even when Low Temperature Superconducting (LTS) materials and/or purely resistant cable are employed). For example, and without limitation, an HTS coil may be made of Rare Earth, Barium-Copper-Oxide (REBCO), $Bi_2Sr_2CaCu_2O_x$ (Bismuth 2212), $MgB_2$ (Magnesium Diboride), and/or iron-based superconducting material.

A person of skill in the art will immediately recognize that individual conductor support is inherent to Canted-Cosine-Theta (CCT) magnet design with the traditional cosine-theta coil geometry. The present invention may support such a simple, single-layer implementation (referred to herein as a "single-COMB design"), that may be similar in outcomes to the CCT geometry in terms of the canted angle approaching zero (i.e. conductors extending parallel to the magnet axis). That is, the single-COMB design is useful for applications that require single-layer coils with individual support of every turn. However, additional benefits of COMB magnet technology become more fully realized in the double-COMB design detailed herein.

Figure 4:
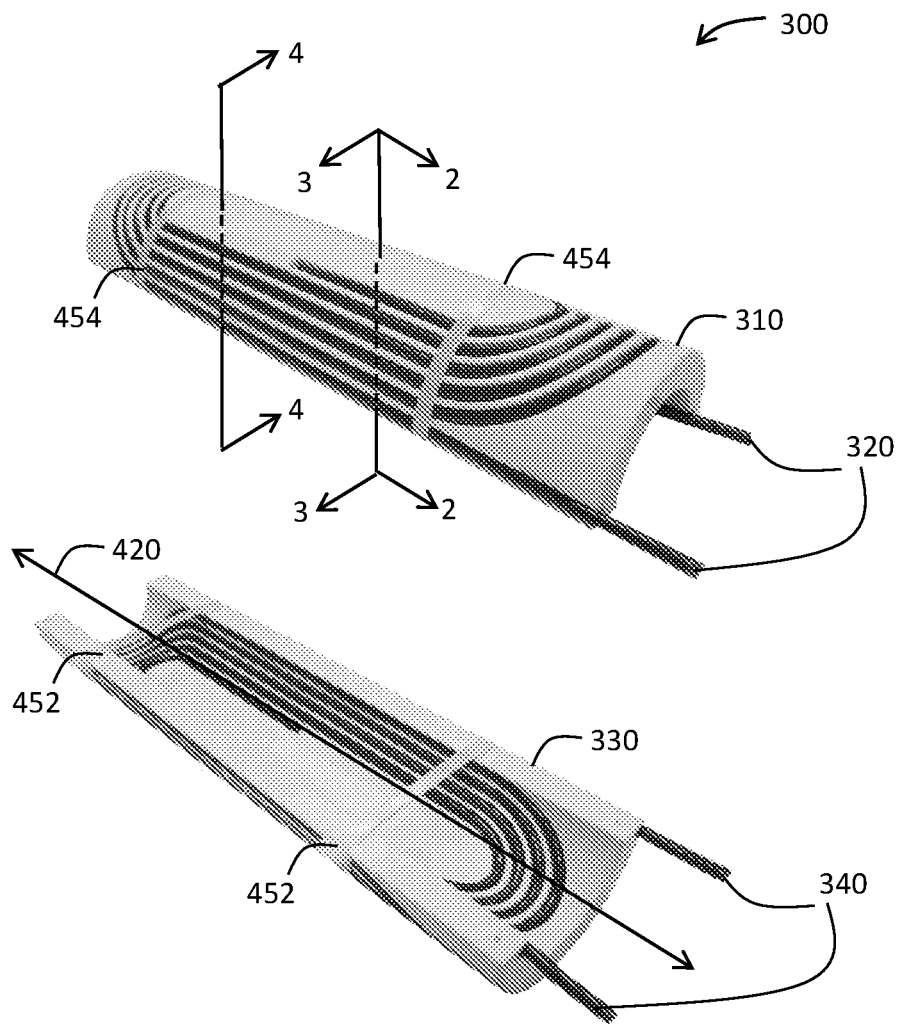
FIG. 4 is a perspective top view of the COMB magnet assembly illustrated in FIG. 1 exploded through line 1-1 of FIG. 1.
Figure 5:
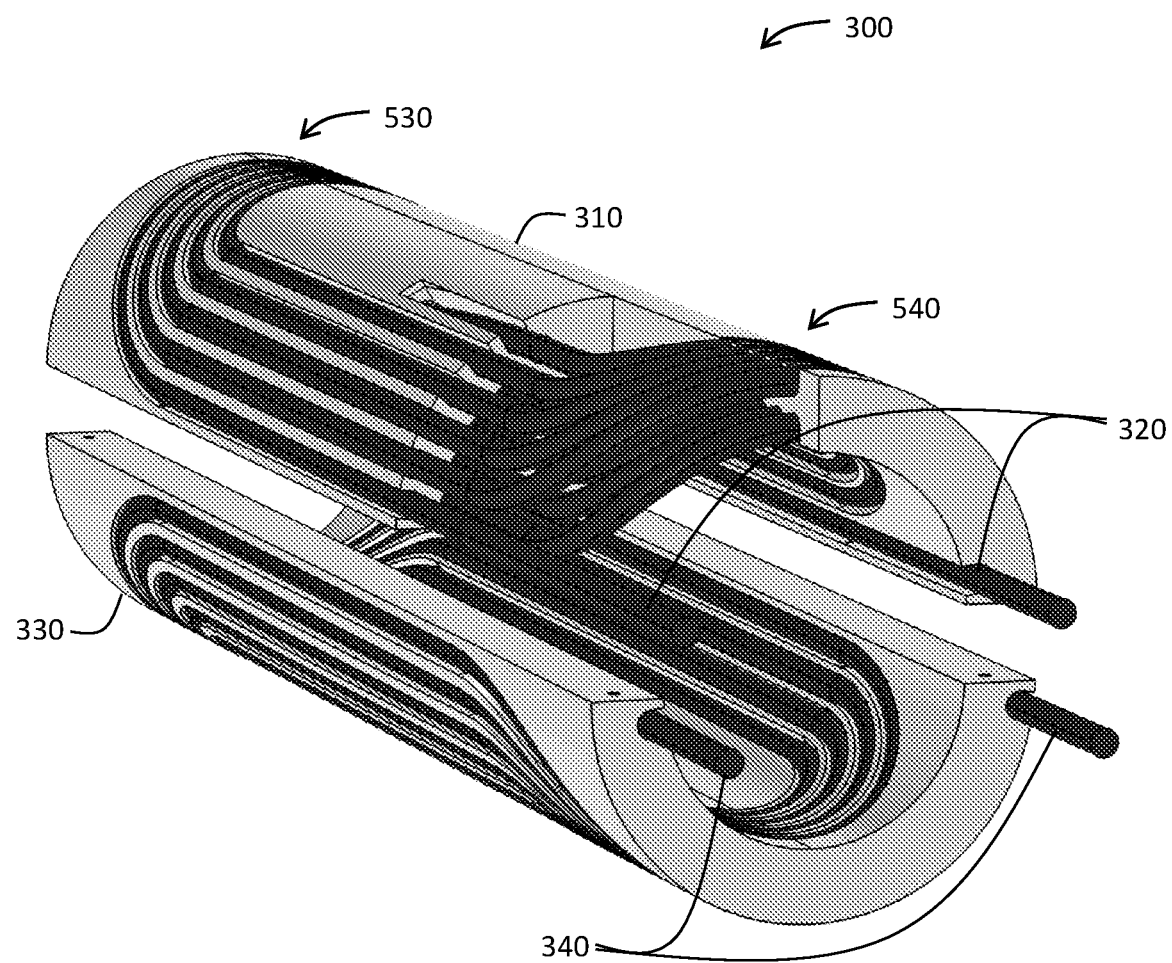
FIG. 5 is a perspective top view of the COMB magnet assembly illustrated in FIG. 1 exploded through line 1-1 of FIG. 1 and cutaway through angle 2-3 of FIG. 4.

An exploded view of the magnet assembly 300 featuring a double-COMB design is shown in FIGS. 3 and 4. One solid conductor support structure (e.g., the top half structure 310) may be configured to fittedly carry two layers of cabling that may comprise a magnetic coil 320 (see also FIG. 5 for an illustration of exemplary cabling layers present in the coil 320). Such layering, created by "winding" of a single cable to present separate layers to be carried by opposite (e.g., inner and outer) surfaces of the top half structure 310, may advantageously eliminate the challenges present in legacy magnet designs (e.g., disconnected parts that must fit together with high precision, as well as a layer-to-layer interface that may be a source of magnet training). For example, the known 15 T dipole design described above has twenty-three (23) separate parts per half-coil (excluding the poles, which may be made as solid pieces), which makes required coil winding very labor intensive. Also, misaligned parts in that prior art design may cause local cable stress concentrations and degraded magnet performance.

Referring again to FIGS. 4 and 5, similar to traditional cosine-theta coils, one or more elongated straight portions 510 of the magnetic coil/conductor 320 may be configured parallel to a magnet axis 420 of the magnet assembly 300 while opposite ends 530, 540 of the coil 320 may be wound comparatively compactly. Such geometry may serve to maximize the useful field region and the integral strength of the coil 320 (that is, 100% of the cable in the straight portions 510 generates the useful transverse field because the cables are positioned parallel to the magnet axis). Also, because the ends 530, 540 are very compact, the magnetic length may be maximized as a result.

Figure 6A:
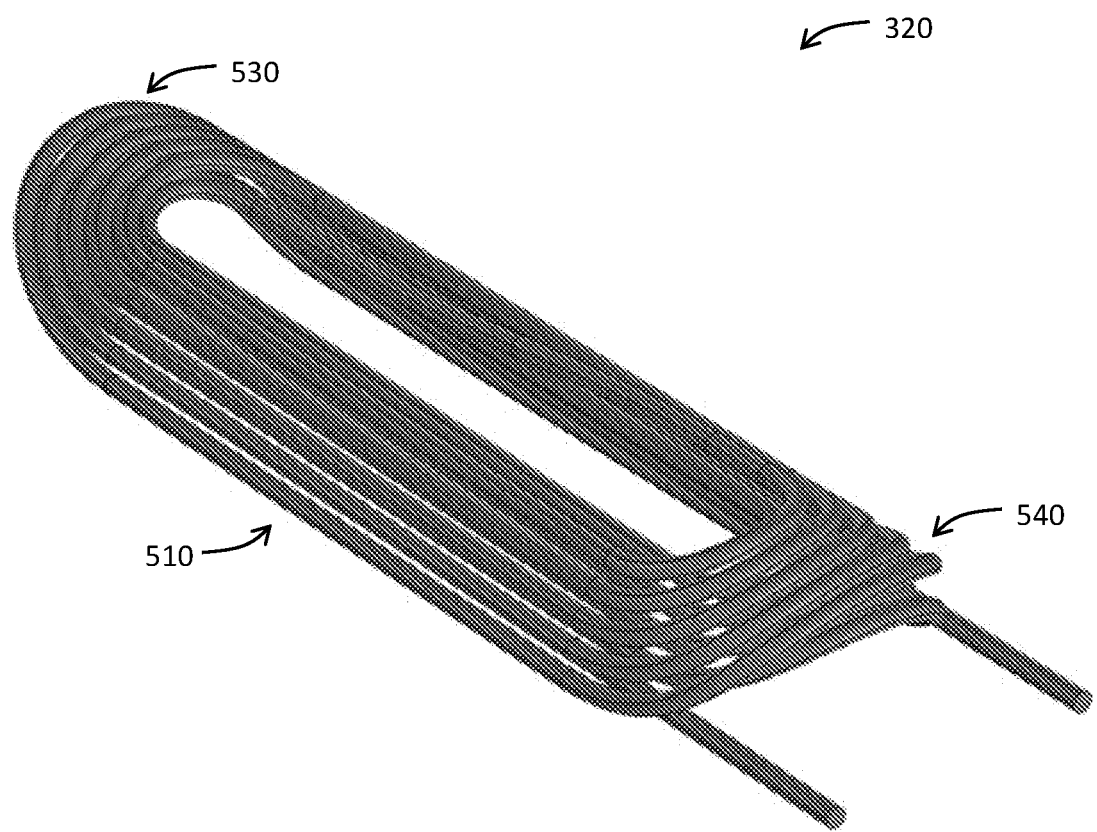
FIG. 6A is a perspective top view of a magnetic coil of the COMB magnet assembly illustrated in FIG. 1.
Figure 6B:
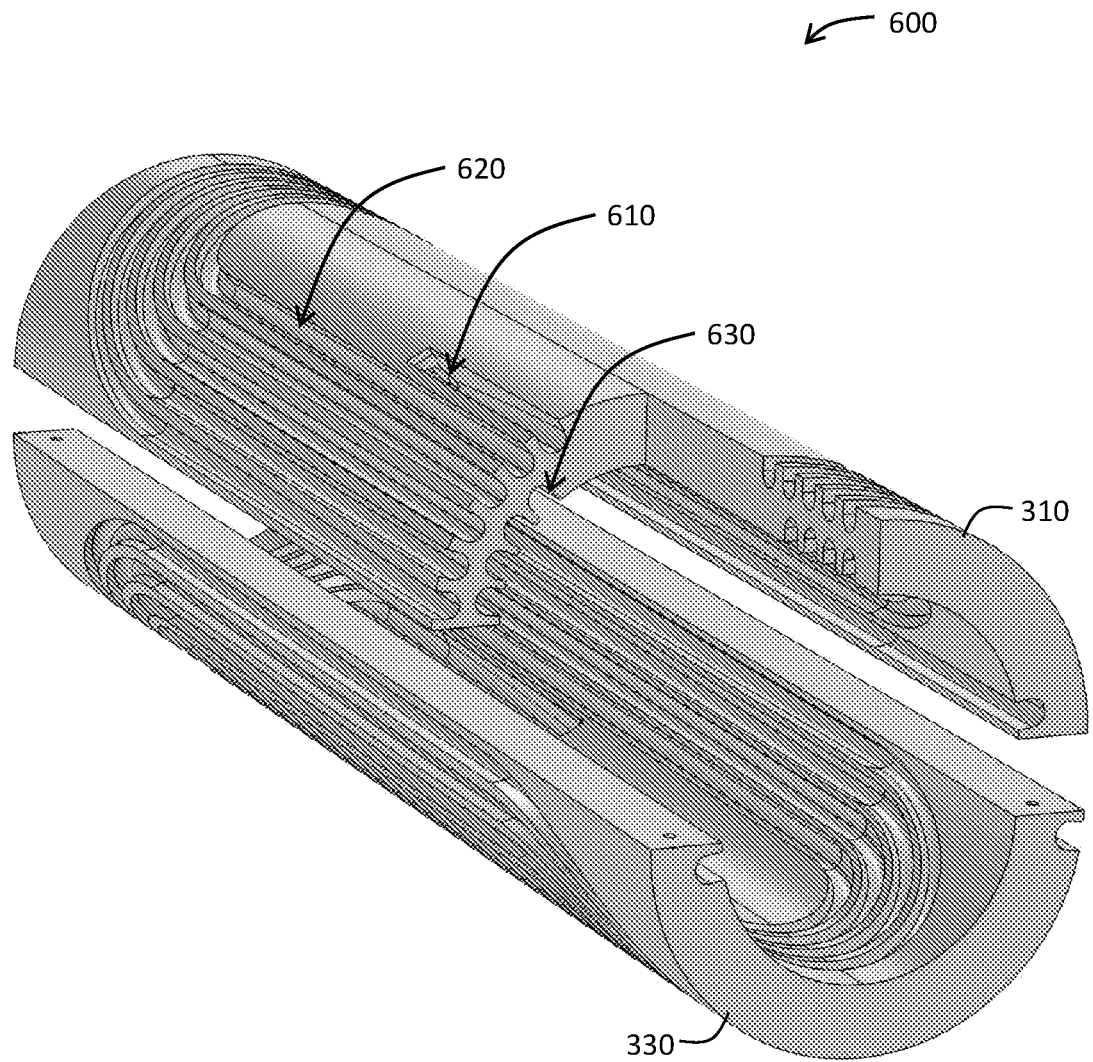
FIG. 6B is a perspective top view of a conductor support structure of the COMB magnet assembly illustrated in FIG. 1 exploded through line 1-1 of FIG. 1 and cutaway through angle 2-3 of FIG. 4.

The exemplary double-COMB design 300 of FIGS. 3 and 4 may advantageously require no splice in between the respective layers of the exemplary coils 320 and 340, which may be especially important when employing HTS materials. Instead, as demonstrated in FIGS. 5 and 6A, the two-layer magnetic coil 320 may be wound from a single cable piece. Referring additionally to FIG. 6B, mating of this magnetic coil 320 with the conductor support structure 310 configured to fittedly carry that coil 320 may require pulling approximately half of the coil 320 through a transition hole 610 in the COMB structure 310 prior to coil winding into outer 620 and inner 630 continuous cable channels.

Because each half of the double-COMB conductor support structure 310, 330 may feature a continuous cable channel of complicated topology spanning both inner 630 and outer 620 surfaces of the barrel 600, such a structure 600 may not be well suited for computer numerical control (CNC) machining. Instead, the complete "barrel" structure 600 may be readily produced by additive manufacturing (e.g., 3D printing) using Direct Metal Laser Sintering (DMLS) or another metal-friendly material deposition process—hence the word "molded" in the name COMB. In the case of a long magnet assembly 300 (e.g., such that the length of the assembly 300 may be much larger than the assembly's 300 transverse dimensions), the central (e.g. straight) part of the conductor support structure 600 may also be assembled from extruded blocks or stamped laminations to minimize fabrication time and cost, with only the ends of the structure 600 requiring 3D printing. Note also that COMB structures may be 3D printed from a variety of metals or also plastics for low field applications. Careful selection of printing materials may also yield cost savings (e.g., Aluminum rather than the significantly more expensive Stainless Steel or Titanium).

Employing a substantially-cylindrical and longitudinally-bored full conductor support structure 600 (e.g., formed from joining the top half structure 310 and the bottom half structure 330), the COMB magnet 300 may be assembled from half-coils (for a dipole) that the conductor support structure 600 may carry and position for retrofit with complementary internal or external HTS or LTS coils. (A person of skill in the art will immediately recognize that "substantially-cylindrical" may include, but is not limited to, definition as circular cylinders, elliptical cylinders, or oval cylinders and still achieve the results and uses described herein).

Figure 6C:
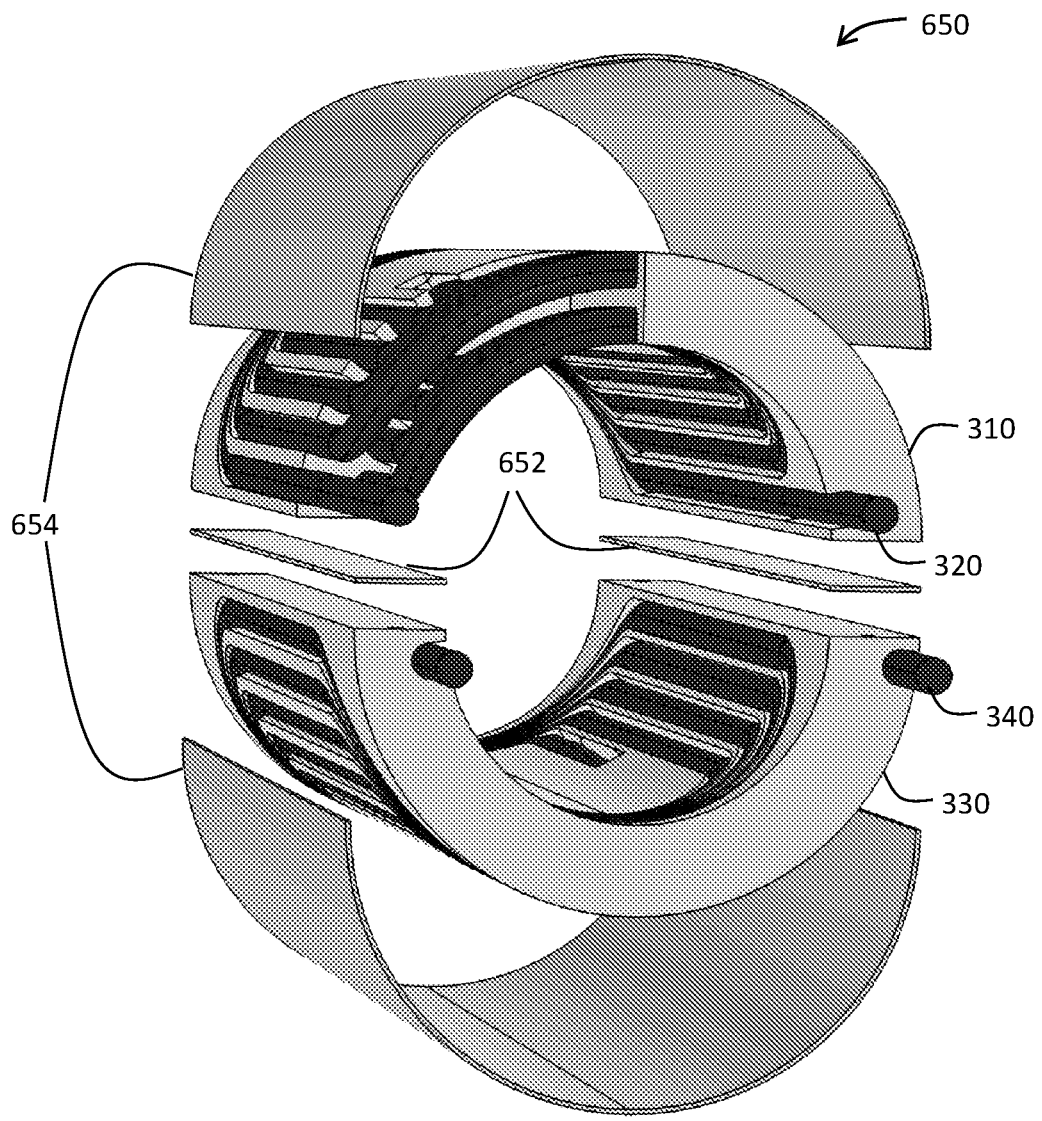
FIG. 6C is a perspective top view of azimuthal shims and midplane shims according to an embodiment of the present invention, and as deployed with the COMB magnet assembly illustrated in FIG. 1 exploded through line 1-1 of FIG. 1 and cutaway through angle 2-3 of FIG. 4.

Referring now to FIG. 6C, a shimmed double-COMB magnet assembly 650 may include midplane 652 and azimuthal 654 shims configured to individually control the prestress in each half-coil. Such shims 652, 654 may be longitudinally coextensive with the conductor support structure 600 or, depending on the planned application and/or required performance of the magnet assembly, may comprise one or more shims that may be longitudinally coextensive with only a portion of the conductor support structure (see, for example, midplane 452 and azimuthal 454 shim pairs as illustrated in FIG. 4). Shimming as described herein may allow the number of magnet assembly layers (e.g., additional inner and/or outer coils) to be easily scalable to achieve a variety of desired fields. For example, and without limitation, the exemplary double-COMB magnet assembly 300 of FIG. 3 may be designed to fit into the bore of a legacy host 15 T dipole magnet as described above.

To assess double-COMB magnet assembly 300 performance with HTS inserts, the magnetic analysis presented hereinbelow was performed for four configurations shown in FIGS. 7A, 7B, 8A, and 8B. The designs were based on the CORC® W5 cable with the average reported $J_e$ of 365 A/mm2 at 20 T and 4.2 K that was parameterized in a relevant range of fields and temperatures. In performance schematic 7000 of FIG. 7A, the assembly "insert" 300 was designed to fit into the 60 mm bore of the Fermilab's 15 T dipole 704. In performance schematic 720 of FIG. 7B, the insert 300 was designed to fit into the 123 mm bore formed by the outer coils of that magnet 724.

Figure 7B:
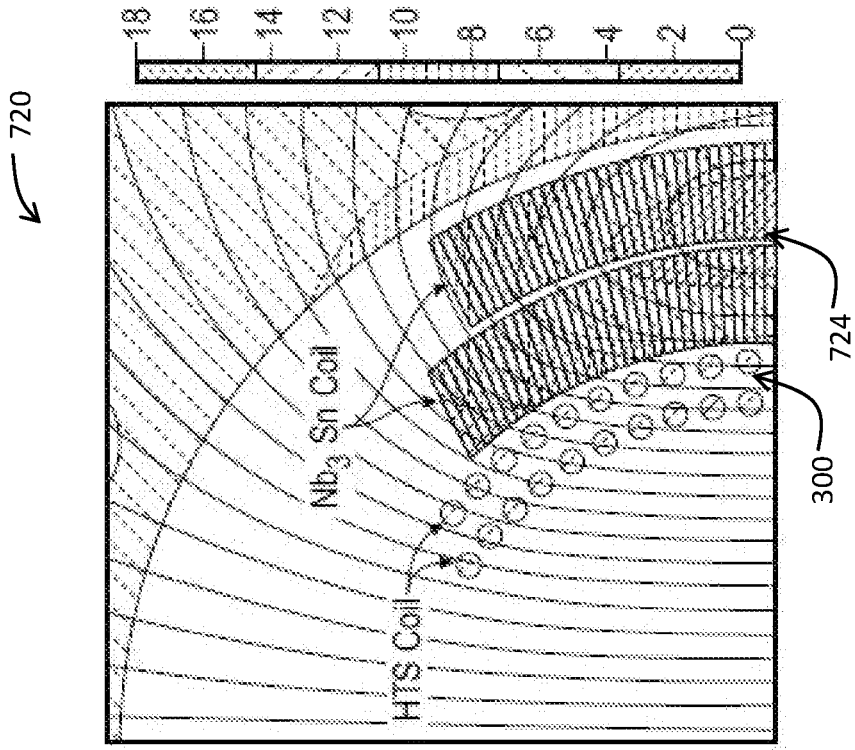
FIG. 7B is a schematic diagram illustrating magnetic performance as simulated for a second exemplary configuration of the COMB magnet assembly illustrated in FIG. 1 and taken through line 4-4 of FIG. 4.

The larger coil 300 of FIG. 7B with 100 mm clear bore is envisioned as the first step in the technology demonstration based on the current generation of CORC® cables due to the large minimum cable bending diameter of 51 mm. The smaller insert coil 300 of FIG. 7A with 40 mm clear bore and the minimum bending diameter of 18 mm may be made when more flexible cables based on the next generation of thinner REBCO tapes become available or from the Bi-2212 conductor.

Figure 7A:
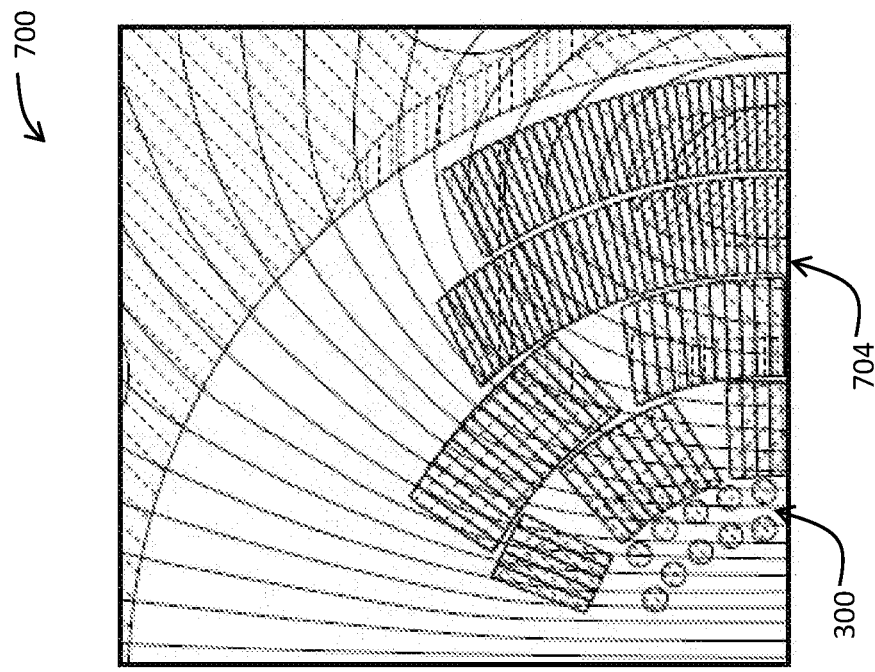
FIG. 7A is a schematic diagram illustrating magnetic performance as simulated for a first exemplary configuration of the COMB magnet assembly illustrated in FIG. 1 and taken through line 4-4 of FIG. 4.

Performances of the HTS coils 300 of FIGS. 7A and 7B are summarized in Table 900 of FIG. 9A at different conditions. The maximum bore fields approach 13-18 T at 1.9 K for the two HTS coils powered to 100% of the Short Sample Limit (SSL) independently of the LTS magnet (with an extra pair of current leads and a power supply). When powered in series, the maximum bore fields of 8.4-11.5 T at 1.9 K are limited by the HTS performance.

While the bore fields are considerably smaller than in the case of independent powering, the forces on the HTS conductors are only 12% lower because of the increased current at lower fields, which makes this test just as useful for evaluating the COMB structure performance. It can be realized with a single pair of current leads and a power supply, but the quench protection of the HTS insert will require a careful consideration to avoid damaging it by the large energy stored in the LTS magnet.

Figure 8B:
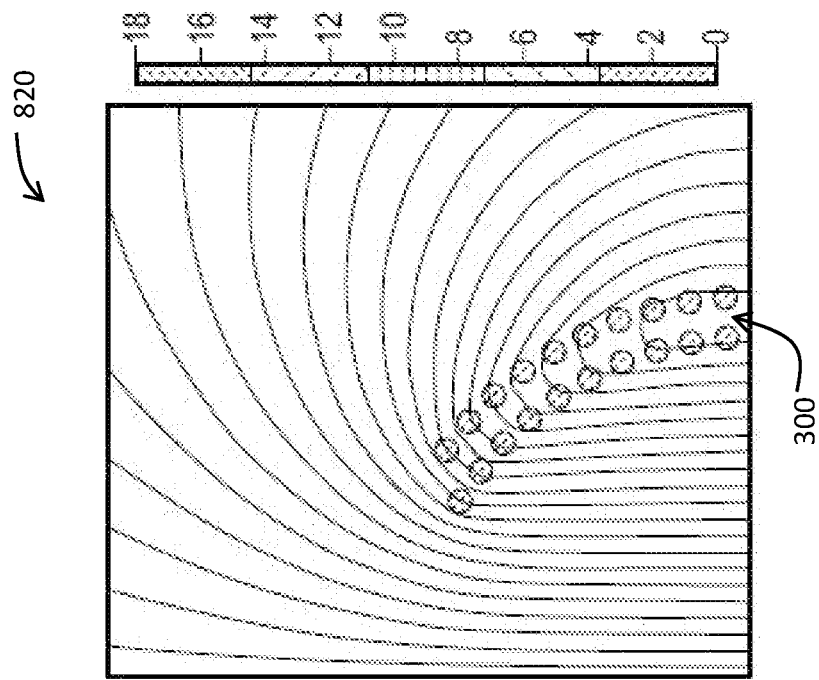
FIG. 8B is a schematic diagram illustrating magnetic performance as simulated for a fourth exemplary configuration of the COMB magnet assembly illustrated in FIG. 1 and taken through line 4-4 of FIG. 4.
Figure 8A:
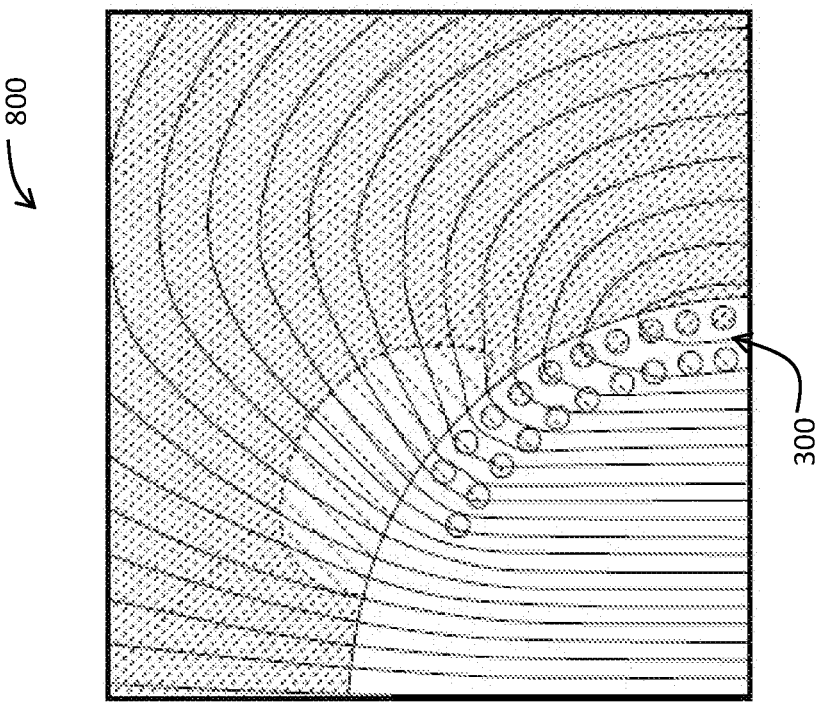
FIG. 8A is a schematic diagram illustrating magnetic performance as simulated for a third exemplary configuration of the COMB magnet assembly illustrated in FIG. 1 and taken through line 4-4 of FIG. 4.

FIGS. 8A and 8B shows the field distribution in the stand-alone HTS coil 300 tests with and without the iron yoke. Performances of the HTS coils 300 of FIGS. 8A and 8B are summarized in Table 910 of FIG. 9B at different conditions. In the stand-alone tests, the HTS coils 300 can first be tested at the liquid nitrogen temperature to 0.5-0.8 T bore fields and then to 3-4.4 T bore fields at 1.9 K, depending on the presence of the iron yoke. While not revealing the full HTS performance, these may still be useful intermediate tests for demonstrating the COMB technology.

The structural analysis was performed for the worst case in terms of the total forces and stresses in the HTS coil, which corresponds to independent powering of the HTS coil 300 of FIG. 7B at 1.9 K. The following assumptions were used: the gap in the iron yoke closes during the cool-down and remains closed under all conditions (i.e., the shell/clamp system is strong enough to make it happen); there is a free sliding contact between HTS-LTS coils, LTS coil and the iron yoke as well as between the cables and the pole blocks in that coil; the coils are prestresses by means of the radial and azimuthal shims during the assembly at the room temperature to the level that all conductors stay in contact with the adjacent parts up to the maximum load; the COMB structure is made of 316L stainless steel.

The equivalent (von Mises) stresses in the coils 310, 320 and the support structure 600 are shown in FIG. 10A after the cool-down from room temperature to 1.9 K 1000 and at the maximum current 1020 quoted in Table 900 of FIG. 9A. After the cool-down 1000, the stress is relatively uniform and on a level of 90-100 MPa in the HTS and the LTS coils. At the maximum current 1020, the stress distribution changes with the bias towards the midplane and the peak stress reaches 160 MPa in the LTS coil (which is acceptable for $Nb_3Sn$ conductor). However, the peak stress in the HTS coil goes only slightly up to 110 MPa, which indicates the stress management (SM) benefits of the COMB structure. This level of stress is low enough even for the strain-sensitive Bi-2212, while the REBCO-based cables can tolerate stresses up to 170 MPa without the critical current degradation. The peak stress in the structure is only 143 MPa, which is approximately half of the yield stress for 316L stainless steel.

For example, and without limitation, such COMB magnet technology may be practically applied not only to cylindrical or dipole geometries, but to any number of poles and odd coils that must depart from self-supporting Roman-arch geometry employed with LTS materials (e.g., quadrupoles for arcs and interaction regions; multipole correctors (e.g. dipole, quadrupole, sextupole, etc.); curved and/or twisted (i.e. helical magnets); gantry systems of proton/ion therapy facilities; polarized beam and muon cooling experiments and light sources; rotors/stators of motors and generators. The operating temperatures supported by the present invention may be in 1.9 K-77 K range, depending on the performance requirements (e.g., cooling by LHe, GHe or LN2; conduction cooling by cryocoolers, which may work especially well with aluminum structures).

The system and method according to an embodiment of the present invention may advantageously boost magnetic performance of future hadron colliders (that is, achieve higher beam energies through increased magnetic field strength), as well as augment legacy LTS magnets (that is, used as inserts in niobium-tin magnets for boosting magnetic field). Fabrication advantages of 3D printing include production cost savings, production time savings, scalability, and compatibility.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. A method of manufacturing a magnet assembly, comprising:
   molding a conductor support structure characterized by a substantially cylindrical shape defining a distally-positioned outer surface and by a longitudinal bore defining a proximally-positioned inner surface, and having a continuous cable channel comprising an outer channel portion incised in the distally-positioned outer surface, an inner channel portion incised in the proximally-positioned inner surface, and a transition hole between the outer channel portion and the inner channel portion; and
   fittedly receiving, using the conductor support structure, at least one magnetic coil comprising at least one conductive cable into the outer channel portion, the inner channel portion, and the transition hole of the continuous cable channel of the conductor support structure to shape the at least one magnetic coil into a cosine-theta geometry characterized by a plurality of elongated straight portions positioned parallel to a magnetic axis of the at least one magnetic coil.

2. The method according to claim 1 further comprising fabricating the at least one magnetic coil from a material type selected from the group consisting of High Temperature Superconducting (HTS), Low Temperature Superconducting (LTS), and purely resistant cable.

3. The method according to claim 2 wherein the at least one magnetic coil is of the material type HTS and is selected from the group consisting of Rare Earth, Barium-Copper-Oxide (REBCO), and $Bi_2Sr_2CaCu_2O_x$ (Bismuth 2212).

4. The method according to claim 1 wherein the fittedly receiving the at least one magnetic coil further comprises shaping the at least one magnetic coil into a cable geometry selected from the group consisting of round, square, and rectangular.

5. The method according to claim 1 wherein the molding the conductor support structure further comprises fabricating the conductor support structure from a support material selected from the group consisting of Stainless Steel, Titanium, Copper, Bronze, Brass, Aluminum, plastic, and fiber-reinforced composite.

6. The method according to claim 1 wherein the fittedly receiving the at least one magnetic coil further comprises shaping the at least one magnetic coil into a magnetic geometry characterized by a poles type selected from the group consisting of dipole, quadrupole, sextupole, octupole and decapole.

7. The method according to claim 1 wherein the molding the conductor support structure further comprises fabricating the conductor support structure to include two longitudinally-symmetrical halves, defined as a first half and a second half.

8. The method according to claim 1 wherein the fittedly receiving the at least one magnetic coil further comprises:
   pulling a first portion of the at least one magnetic coil through the transition hole to position the first portion proximate the inner surface of the conductor support structure and to position a second portion of the at least one magnetic coil proximate the outer surface of the conductor support structure;
   fittedly winding the first portion of the at least one magnetic coil into the inner channel portion of the conductor support structure; and
   fittedly winding the second portion of the at least one magnetic coil into the outer channel portion of the conductor support structure.

9. The method according to claim 7 wherein the molding the conductor support structure further comprises positioning an azimuthal shim in mechanical communication with the outer surface of the first half, and positioning a midplane shim in mechanical communication with both the first half and the second half along a line of symmetry between the first half and the second half.

10. The method according to claim 1 wherein the molding of the conductor support structure is of an additive manufacturing type selected from the group consisting of direct metal laser sintering (DMLS), electron beam melting (EBM), selective laser melting (SLM), and fused deposition modeling (FDM).

* * * * *